(12) United States Patent
Henry et al.

(10) Patent No.: US 9,037,461 B2
(45) Date of Patent: May 19, 2015

(54) METHODS AND SYSTEMS FOR DICTATION AND TRANSCRIPTION

(71) Applicant: SpeakWrite, LLC, Austin, TX (US)

(72) Inventors: Paul Henry, Austin, TX (US); Richard Jackson, Austin, TX (US)

(73) Assignee: SpeakWrite, LLC, Austin, TX (US)

( * ) Notice: Subject to any disclaimer, the term of this patent is extended or adjusted under 35 U.S.C. 154(b) by 335 days.

(21) Appl. No.: 13/747,234

(22) Filed: Jan. 22, 2013

(65) Prior Publication Data

US 2013/0204618 A1   Aug. 8, 2013

Related U.S. Application Data

(60) Provisional application No. 61/588,427, filed on Jan. 19, 2012.

(51) Int. Cl.
*G10L 15/26* (2006.01)
*H04M 3/56* (2006.01)
*H04M 3/42* (2006.01)
*H04L 29/08* (2006.01)

(52) U.S. Cl.
CPC ........... *G10L 15/26* (2013.01); *H04M 3/568* (2013.01); *H04L 67/06* (2013.01); *H04M 3/42221* (2013.01); *H04M 2201/40* (2013.01); *H04M 2203/301* (2013.01)

(58) Field of Classification Search
CPC ........................................ G10L 15/26
USPC ........................................... 704/235
See application file for complete search history.

(56) References Cited

U.S. PATENT DOCUMENTS

| | | | | |
|---|---|---|---|---|
| 7,298,930 B1* | 11/2007 | Erol et al. | | 382/305 |
| 7,606,444 B1* | 10/2009 | Erol et al. | | 382/305 |
| 7,974,841 B2* | 7/2011 | Bengtsson | | 704/233 |
| 8,126,183 B2* | 2/2012 | Enstad et al. | | 381/360 |
| 8,248,448 B2* | 8/2012 | Feng et al. | | 348/14.01 |
| 8,314,829 B2* | 11/2012 | Cutler | | 348/14.01 |
| 8,395,653 B2* | 3/2013 | Feng et al. | | 348/14.08 |
| 2005/0254440 A1* | 11/2005 | Sorrell | | 370/264 |

* cited by examiner

*Primary Examiner* — Susan McFadden
(74) *Attorney, Agent, or Firm* — DuBois, Bryant & Campbell LLP; William D. Wiese

(57) ABSTRACT

Automated delivery and filing of transcribed material prepared from dictated audio files into a central record-keeping system are presented. A user dictates information from any location, uploads that audio file to a transcriptionist to be transcribed, and the transcribed material is automatically delivered into a central record keeping system, filed with the appropriate client or matter file, and the data stored in the designated appropriate fields within those client or matter files. Also described is the recordation of meetings from multiple sources using mobile devices and the detection of the active or most prominent speaker at given intervals in the meeting. Further, text boxes on websites are completed using an audio recording application and offsite transcription.

10 Claims, 20 Drawing Sheets

| Account | say "Create or Find Account" |
|---|---|
| Field Name | Values |
| Name: | |
| Customer Classification: | A-customer |
| | B-customer |
| | CC-important |
| default | CC miscellaneous |
| | New Business |
| Interaction | say "Create Interaction" |
| *Account ID: | |
| Description: | |
| Category: | |
| | FAX |
| | Letter |
| default | Telephone Call |
| Importance: | [blank] |
| | very high |
| | high |
| | medium |
| | low |
| Notes: | |

| | New Account | |
|---|---|---|
| New Contact | Name: | New Account |
| | Customer Classification: | CC Important ▼ |
| New Interaction | Value Chain Position: | Develper (Real Est) ▼ |
| | House Number: | 1244212 |
| New Account | Street: | James Park Circle |
| | Postal Code: | 78726 |
| New Customer Visit | City | Austin |
| | Country: | US - United States ▼ |
| | Language: | ES - Spanish ▼ |
| | | View Results |

| New Contact | |
|---|---|
| Account ID: | |
| Title: | Mr. ▼ |
| First Name: | John |
| Last Name: | Kozart |
| Phone: | |
| Mobile: | |

*FIG. 2*

Target Application or Web Site

Title

Combo  ComboBox ▶

Date  / /

Description  http://spwr.co?edfs

FIG. 17

Recording Website

We are still working on this. It should be back to you shortly

Listen to audio

FIG. 18

METHODS AND SYSTEMS FOR DICTATION AND TRANSCRIPTION

CROSS-REFERENCE TO RELATED APPLICATIONS

This non-provisional application claims priority based upon prior U.S. Provisional Patent Application Ser. No. 61/588,427 filed Jan. 19, 2012 in the names of Paul Henry and Richard Jackson entitled "Method and System for Mobile Dictation," the disclosure of which is incorporated herein in its entirety by reference as if fully set forth herein.

BACKGROUND OF THE INVENTION

Dictation and transcription systems known in the art have a number of shortcomings. For example, existing systems do not allow for a user to dictate information into a mobile device based on cues, or data call sheets, available to the user, upload that resulting recorded audio to an offsite transcriptionist to be transcribed and, after transcription, the completed, transcribed file is automatically delivered into a central record keeping system, filed with the appropriate client or matter file and the data stored in the designated appropriate fields within those client files.

In addition, transcription and dictation systems known in the art are inefficient at transcribing meetings. For example, current transcription systems cannot effectively identify the active speaker and make a continuous transcription of that speakers transcription until another speaker becomes the active speaker.

Finally, presently available dictation and transcription systems lack flexibility in their use with Mobile device applications and websites. Again, by way of example, when completing forms on websites, current dictation and transcription systems do not assist the user of the application or site with the population of text boxes appearing on the application or website.

There is a need, therefore, for a dictation and transcription system that allows for the efficient dictation, delivery and storage of files in a central record keeping system, that identifies for transcription the active speaker in a meeting with two or more participants, and that allows the placement of transcribed text into a text box on an application or website.

SUMMARY OF THE INVENTION

The method and system of the present invention relates to and includes the automated delivery and filing of transcribed material prepared from dictated audio files into a central record-keeping system. Through use of the present method and system, a user may dictate data and narrative information from any location through a mobile device, upload that resulting recorded audio to an offsite transcriptionist for transcription and the completed, transcribed material is automatically delivered into a central record keeping system, filed with the appropriate client or matter file with the data stored in the designated appropriate fields within those client or matter files. The present method and system works with any centralized data collection software system, including customer relationship management applications, time and expense record keeping systems, investigation or compliance reporting applications, law enforcement investigation files, and the like.

Some embodiments of the present invention include the ability to record meetings from multiple sources using mobile devices and the ability to detect the active or most prominent speakers at given intervals by analyzing the audio files received from the multiple sources.

Further embodiments of the present invention include the ability to integrate offsite transcription into any text box of a designated website by using an audio recording application. The recording application record the user's voice and generates a unique URL recording that links to a website where the user can play back the recording and view the transcript of the recording.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

FIG. 2 depicts one embodiment of a data entry screen shot of the present invention;

FIG. 17 is a screen shot of an application or website in which the URL for the transcription has been placed in the desired location;

FIG. 18 is a screen shot of an application or website during the transcription process;

DETAILED DESCRIPTION OF THE INVENTION

The present invention is directed to methods and systems for improving the dictation and transcription process. The configuration and use of the presently preferred embodiments are discussed in detail below. It should be appreciated, however, that the present invention provides many applicable inventive concepts that can be embodied in a wide variety of contexts other than the simple recordation and transcription of audio files. Accordingly, the specific embodiments discussed are merely illustrative of specific ways to make and use the invention, and do not limit the scope of the invention. In addition, the following terms shall have the associated meaning when used herein:

"audio stream" means and includes an audio file containing a recording of a conference from a telephone or mobile device;

"audio sample" means and includes a small section of audio used to determine which audio stream includes the active speaker;

"central record keeping system" means and includes a system into which a transcriptionist inserts records for storage and retrieval, such as, for example, a customer relationship management system;

"conference bridge" means and includes a system that allows multiples participants to listen and talk to each other over the telephone lines, VOIP, or similar system;

"data entry system" means and includes a system into which a user enters dictated records;

"data integration module" means and includes a system that maps information collected for a data entry system into a central record keeping system;

"designated website" means and includes any application or website into which a URL generated by the present invention will be inserted;

"digital transcribing software" means and includes audio player software designed to assist in the transcription of audio files into text;

"meeting organizer" means and includes any person who sets up a meeting or creates a meeting room;

"meeting participant" means and includes any person who participates in a meeting, including by dialing into a meeting's conference bridge number or joining a meeting from a mobile device;

"meeting room" means and includes a virtual location where two or more participants meet with the intention of recording audio from the meeting;

"mobile device" means any portable handheld computing device, typically having a display screen with touch input and/or a miniature keyboard, that can be communicatively connected to a meeting;

"speaker switch duration" means and includes the number of samples that an audio stream needs to consecutively have the highest amplitude before becoming the stream designated as having the active speaker at a point in a meeting;

"typist" means a person or application that transcribes audio files into text.

Figure 1:
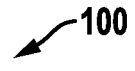
FIG. 1 depicts one embodiment of a dictation call card of the present invention.

Referring now to FIG. 1, which shows one embodiment of the present invention that includes a predetermined dictation call card 100 or "script" that is prepared for use by a user dictating a message for transcription. The user dictates a record or records based on the dictation call card 100. The dictation call card 100 assists the user in the process of initiating a new record, naming the fields, and determining which fields are required and the available choices for those fields. In some embodiments, the dictation call card 100 may also have instructions on how to dictate relationships between records, such as including a record identifier or search information. The dictation call card 100 may include multiple record types. Each record type may be delivered to a specified location in a central record keeping system. For instance, the dictation call card 100 could have a script for creating a new account 101 and a new customer interaction. The new account script would create a new account, and the new interaction script will create a new interaction in the central record keeping system. The user may also dictate one or more records within the same audio file.

By way of example, a user could dictate the following message "Create Interaction, Account ID, 3425444, Category Letter, Notes, This is a sample interaction." When the dictation is concluded, the user delivers the completed audio dictation file via a network to, for example, an offsite transcription provider. The transcription provider processes the audio dictation file so that it can be delivered over a network to a typist using digital transcribing software or otherwise converted into a text file.

Digital transcription software allows a typist to listen to an audio file and transcribe it into the transcription provider's data entry system. The transcription provider's data entry system provides a user interface, one embodiment of which is shown in FIG. 2, that allows the typist to enter information dictated by the user and to store that record in a database. When each new record type is dictated, the typist will create a new record in the data entry system.

Once the record or records are entered, the typist will submit the data to the data entry system. Next, a data integration module will insert the record or records collected in the data entry system into the central record system. Each central record system will have its own interface and the data integration module will map the data collected in the data entry system to the fields in the central record keeping system. The data integration module may utilize an API (application programming interface) or, in another embodiment, will automatically simulate mouse clicks and key strokes directly into the central record keeping system using browser automation software. If the dictation call card 100 calls for linking records together, the data integration module will perform a data lookup in the central record keeping system to find the correct identifier of the record being linked and store it with the new record. The data entry module will collect any errors and record identifiers returned from the central record system and generate a summary document. The summary document includes the information collected in the data entry system and the transaction results returned from the central recording keeping system.

In another embodiment of the present invention, a meeting organizer may create a new meeting via a web interface, mobile device application, or by using a meeting room that has already been created. Meeting participants enter the meeting room designated by the meeting organizer by dialing into a conference bridge or signing in to the meeting via a web interface or an application on a mobile device.

Figure 3:
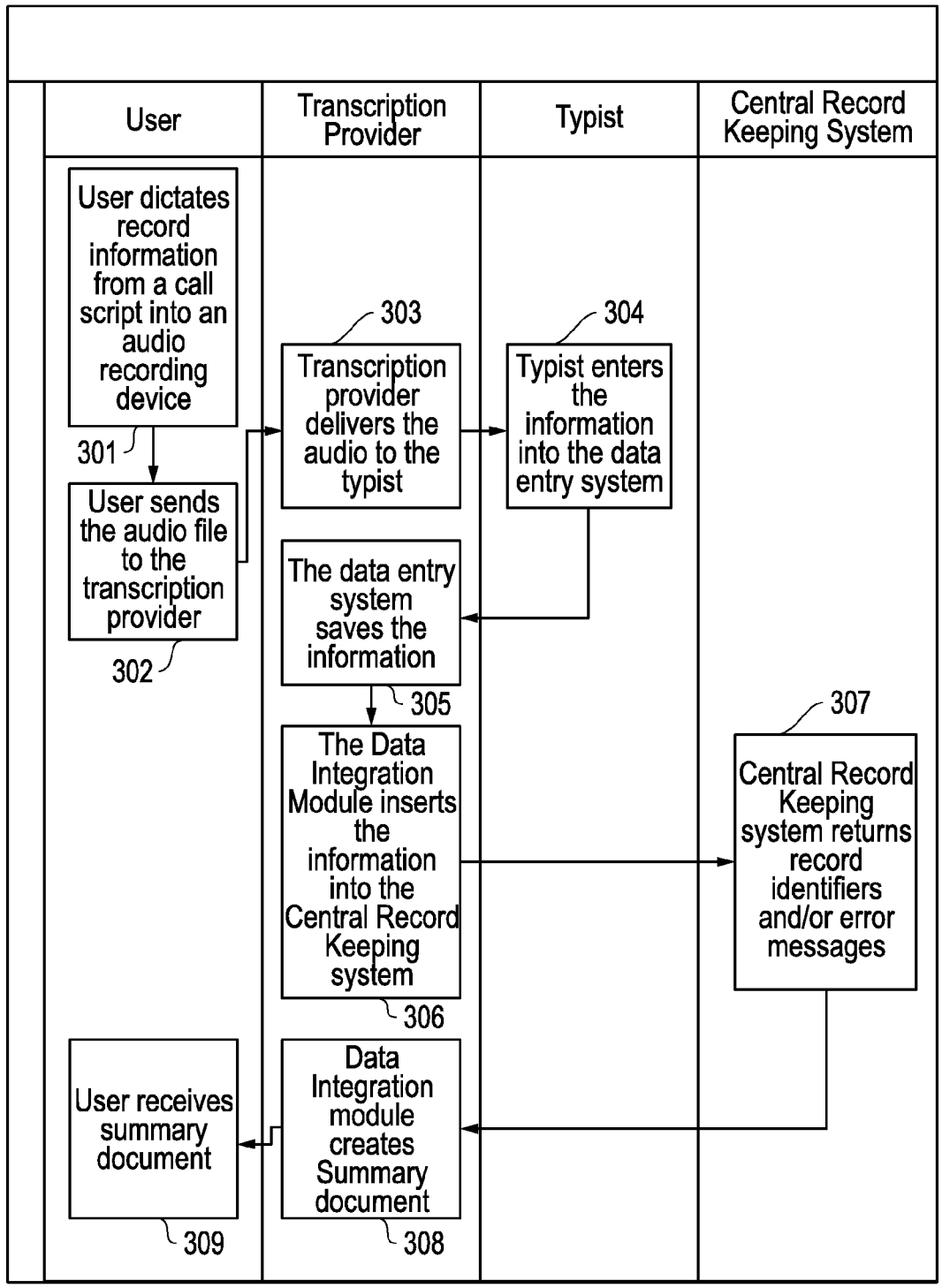
FIG. 3 is a flow diagram showing the process of transcribing a system remotely for storage in a remote record keeping system.

FIG. 3 depicts a flow diagram of the previously described process, wherein a user records information from a dictation call card 101 into an audio recording device 301. The user then sends the audio file to the transcription provider 302. The transcription provider delivers audio to the typist 303. The typist enters the information into the data entry system 304. The information is then saved by the data entry system 305. The data integration module inserts the information into the central record keeping system 306. The central record keeping system returns record identifiers and/or error messages 307. The data integration module then creates a summary document 308, and the user receives the summary document 309.

Figure 4:
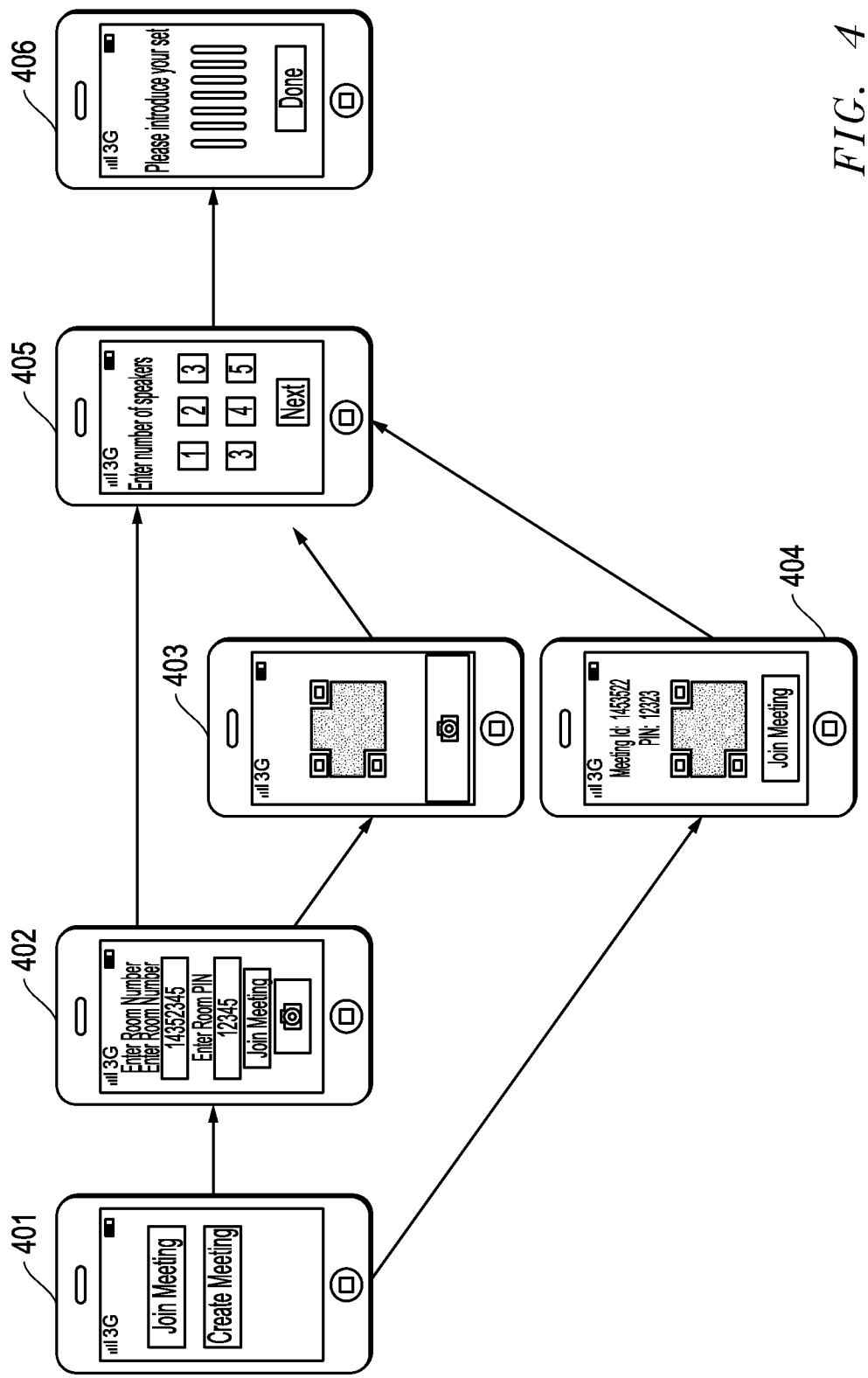
FIG. 4 is flow diagram showing the process of signing into a meeting using a mobile device.

Referring now to FIG. 4 which depicts the process a user would follow when signing into a meeting from a mobile device. When first signing in, a user will select to join a meeting or create a meeting 401. If the user elects to join a meeting, the user will be prompted 402 for the meeting room number and pin. Alternatively, the user can tap the camera button on his or her mobile device to select the meeting via a QR Code or similar scanner function included, for example, in a mobile device application. If a meeting participant selects to join a meeting via a scanner function 403, the participant would position the mobile device in front of the meeting organizer's mobile device with the scanner image or, alternatively, a printout, for example, from a meeting agenda with the scanner image. When creating a meeting using a mobile device 404, the mobile device application will display the meeting's room number and PIN, and optionally a scanner image, to the meeting organizer. When joining a meeting, a participant will be prompted 406 on how many participants will be using this device as their audio recorder.

Figure 5A:
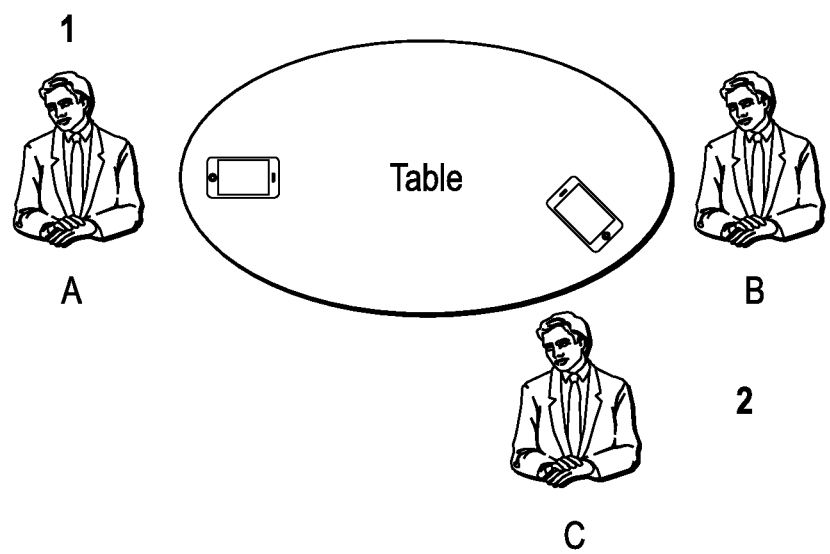
FIG. 5A is a depiction of a meeting with three participants using two mobile devices.

One embodiment of the present invention is shown in FIG. 5A, in which participant A would select "1" for the number of participants who will be speaking during the meeting and participant B and C would enter "2" for the number of participants who will be speaking during the meeting.

Figure 5B:
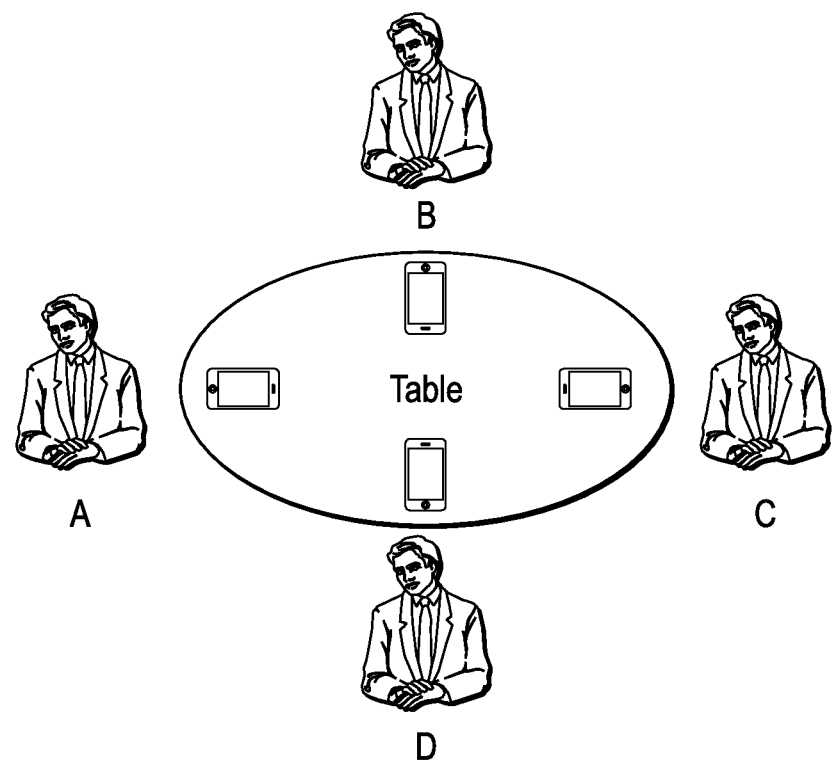
FIG. 5B is a depiction of a meeting with four participants, each with their own mobile device.

Using similar logic, in the embodiment shown in FIG. 5B, participants A, B, C and D would each select "1" when prompted for the number of participants who will be speaking during the meeting. In some embodiments, each speaker will identify themselves by dictating his or her name after joining the meeting. When each participant is finished, the system will start recording audio for the meeting.

Figure 6:
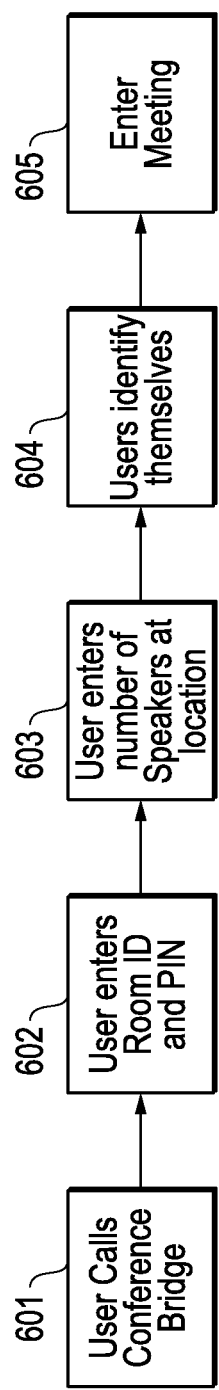
FIG. 6 is a flow diagram showing the process of signing in from a conference bridge.

Referring now to FIG. 6, which shows a flow diagram in which a user calls in from a conference bridge. The user first calls the conference bridge 601. Upon being connected, the user enters the room id and pin for the meeting 602. The user then enters the number of speakers at the user's location 603. Each speaker identifies themselves by dictating their name 604 and, when each participant is finished, the users enter the meeting 605 and the system commences recording audio for the meeting.

Figure 7:
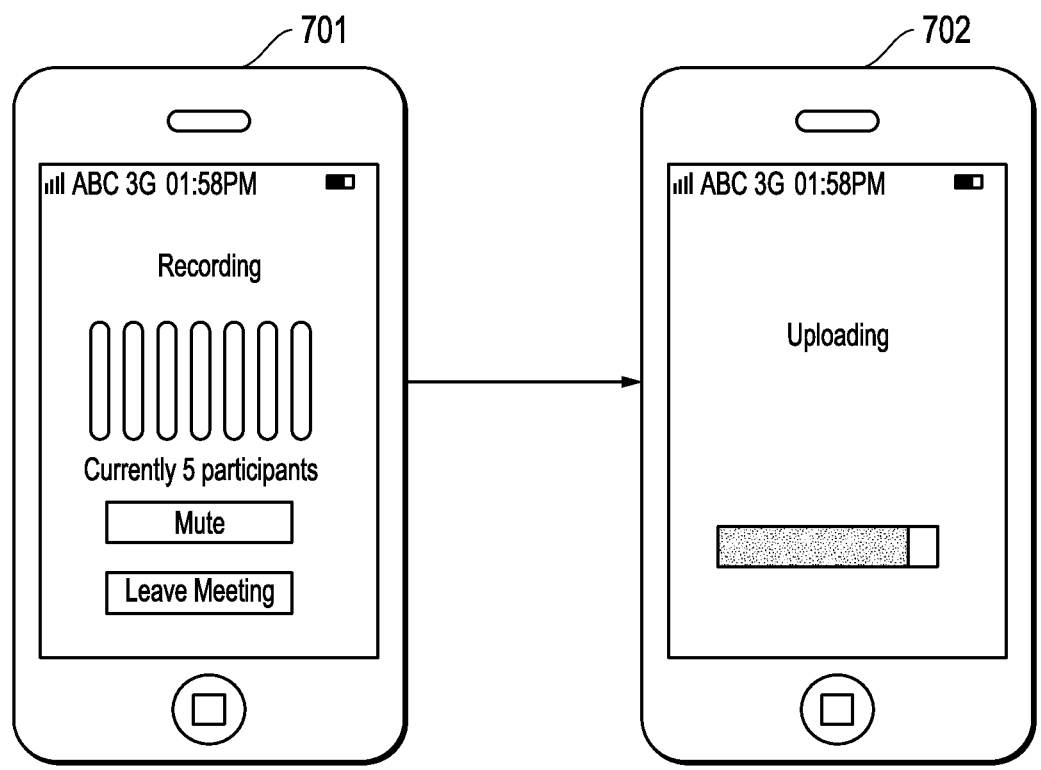
FIG. 7 shows two screen shots from a mobile device, one during a meeting and one after the end of the meeting.

As shown in FIG. 7, in certain embodiments, when the participants join the meeting, the application will use the telephone's or the mobile device's microphone to store audio files to its local storage 701. After the meeting has ended, or all participants leave the meeting, the application will upload 702 the audio to a server for processing. In another embodiment, one or more of the participants is continuously communicatively connected to the server during the meeting, in which case there is no need to upload the audio to the server for processing after the end of the meeting.

Figure 8:
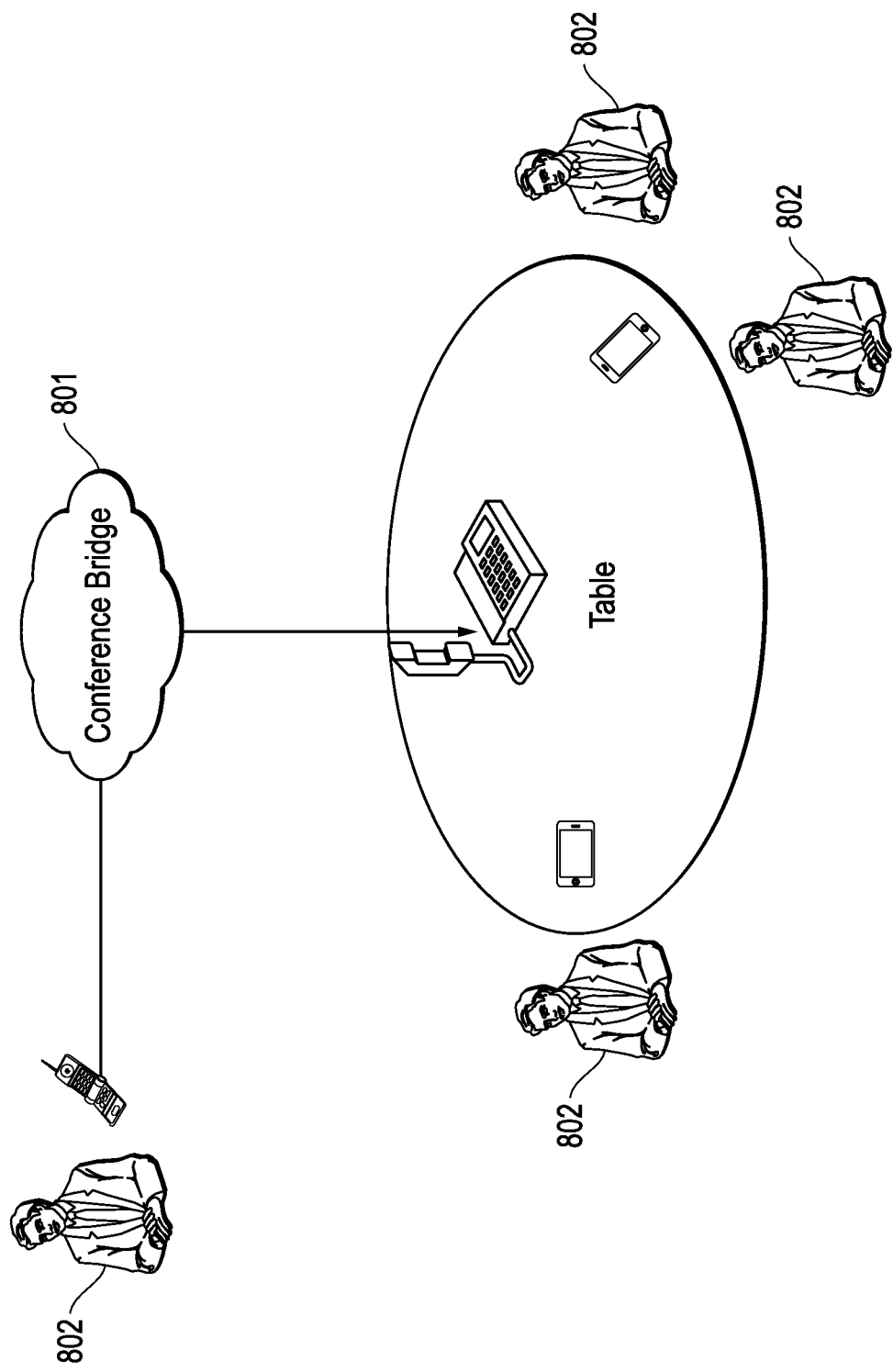
FIG. 8 is a depiction of a meeting that incorporates a mobile device and a conference bridge.

As shown in FIG. 8, a conference bridge 801 may also be used in certain embodiments of the present invention. The conference bridge 801 will record each caller 802 to a separate audio file. When all parties leave the meeting, the audio files will be eligible for processing. In addition, meeting rooms can combine the conference bridge 801 and mobile device applications to include participants from remote locations.

Figure 9:
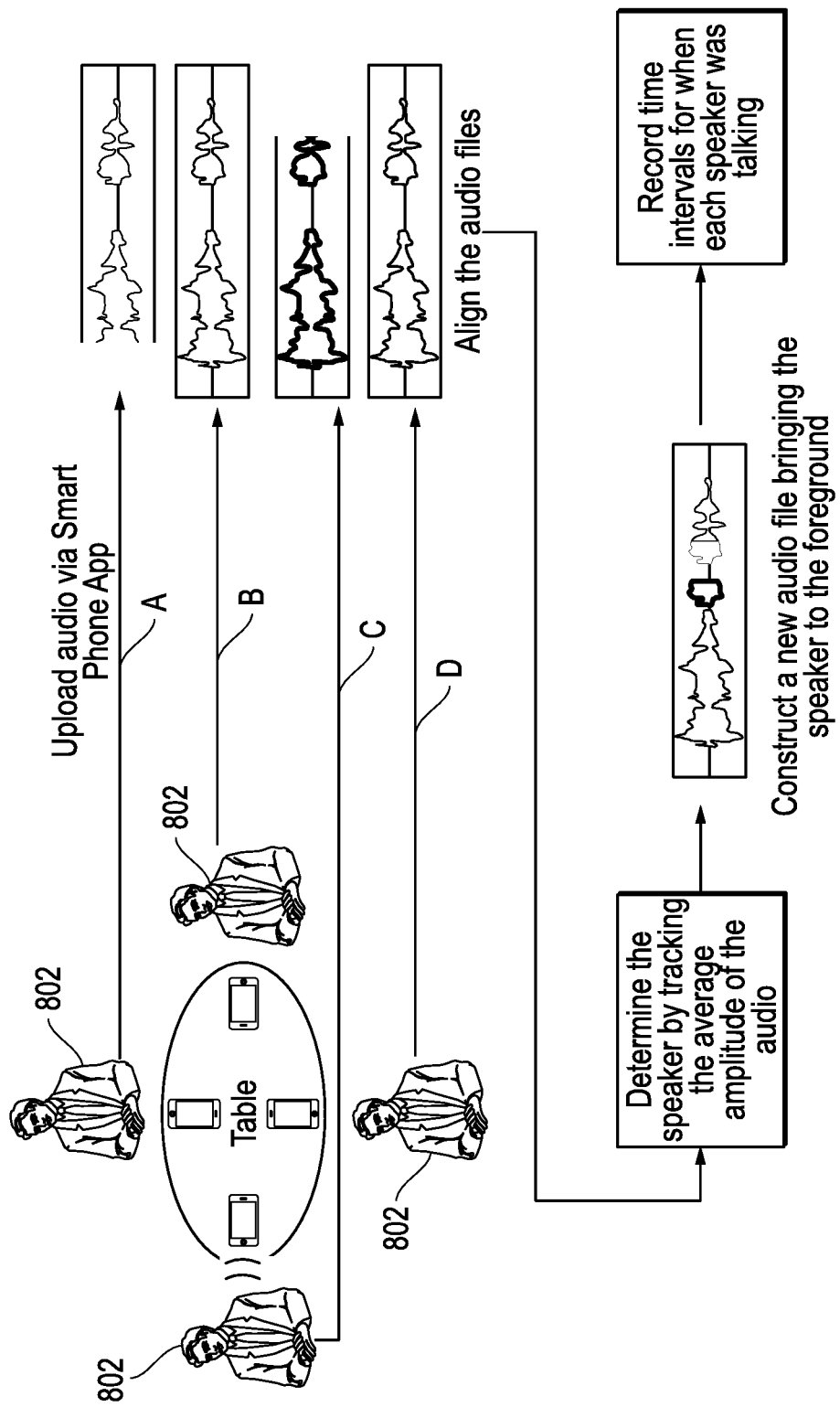
FIG. 9 is a flow diagram showing an embodiment of how the audio files are processed from a conference with four participants.

As shown in FIG. 9, in those cases in which each participant 802 is not connected to the server during the meeting, then, after the meeting is finished, each participant 802 will upload the audio stream to a server for processing. For example, one participant 802 will upload a first audio stream A for processing, a second participant 802 will upload a second audio stream B for processing, a third participant 802 will upload a third audio stream C for processing, and a fourth participant 802 will upload a fourth audio stream D for processing. As described further below, the system aligns the first audio stream A, the second audio stream B, the third audio stream C and the fourth audio stream D to determine on which audio stream the active speaker appears at various points during the meeting. A new audio stream may then be created containing only the sections of the audio that include the active speaker.

Figure 10:
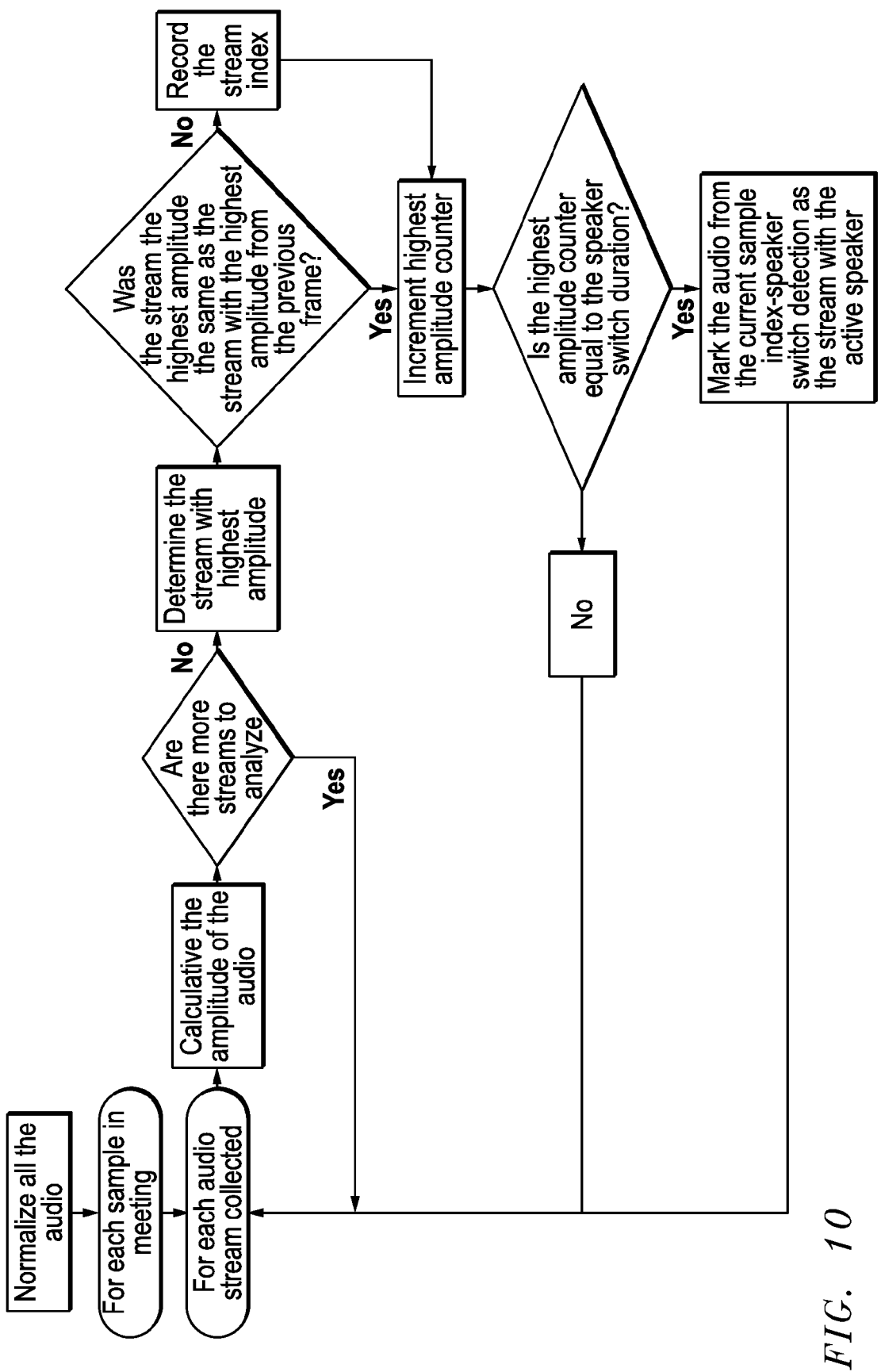
FIG. 10 is a flow diagram showing a process for determining the active or most prominent speaker in a conference.

To determine which speaker is the active speaker, each of the audio streams A, B, C and D the volume of each of the audio streams is first normalized so that each stream is at approximately the same amplitude. The amplitude is then calculated for each audio sample in each audio stream. If an audio stream contains the greatest amplitude for the number of audio samples defined as the speaker switch duration, the audio stream is marked as having the active speaker at that point in the meeting FIG. 10 provides a flow diagram of the foregoing process, wherein all of the audio if first normalized for each sample in the meeting. A calculation is then made of the amplitude of each audio stream. Next, the stream with the highest amplitude is identified. If the stream with the highest amplitude is not the same as the stream with the highest amplitude from a prior frame, then record the stream index. However, if the stream with the highest amplitude is the same as the stream with the highest amplitude from the prior frame, then move to increment the highest amplitude counter. If the highest amplitude counter is not the same as the speaker switch duration, then return to calculate the amplitude of the audio for each stream. However, if the highest amplitude counter is the same as the speaker switch duration, then mark the audio from the current sample index as the stream with the active speaker and then return to re-calculate the amplitude of the audio for each stream.

Figure 11:
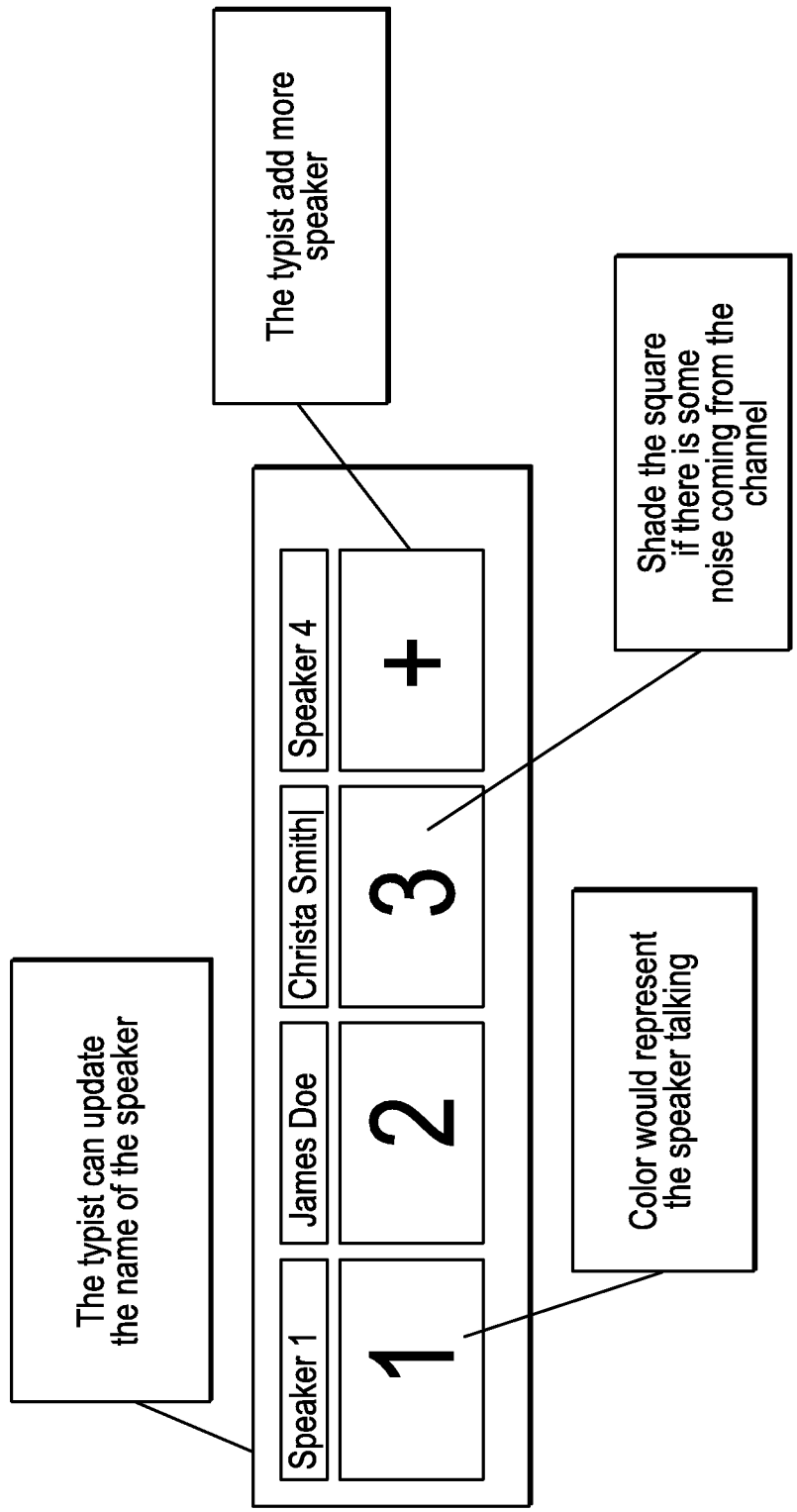
FIG. 11 is one embodiment of a screen shot showing how the system of the present invention may assist the transcriptionist.
Figure 12:
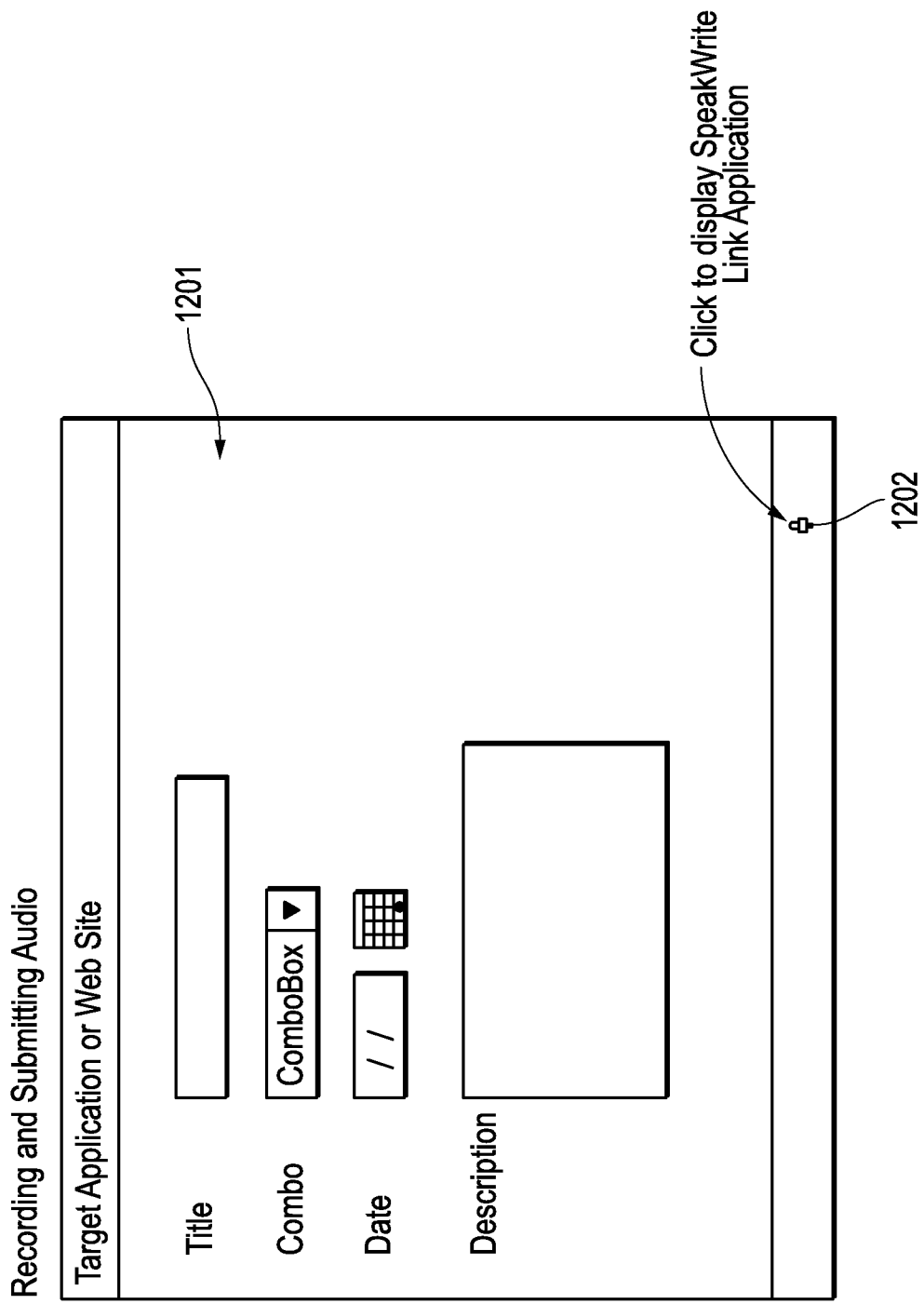
FIG. 12 is a screen shot of an application or website before a user dictates an entry.
Figure 13:
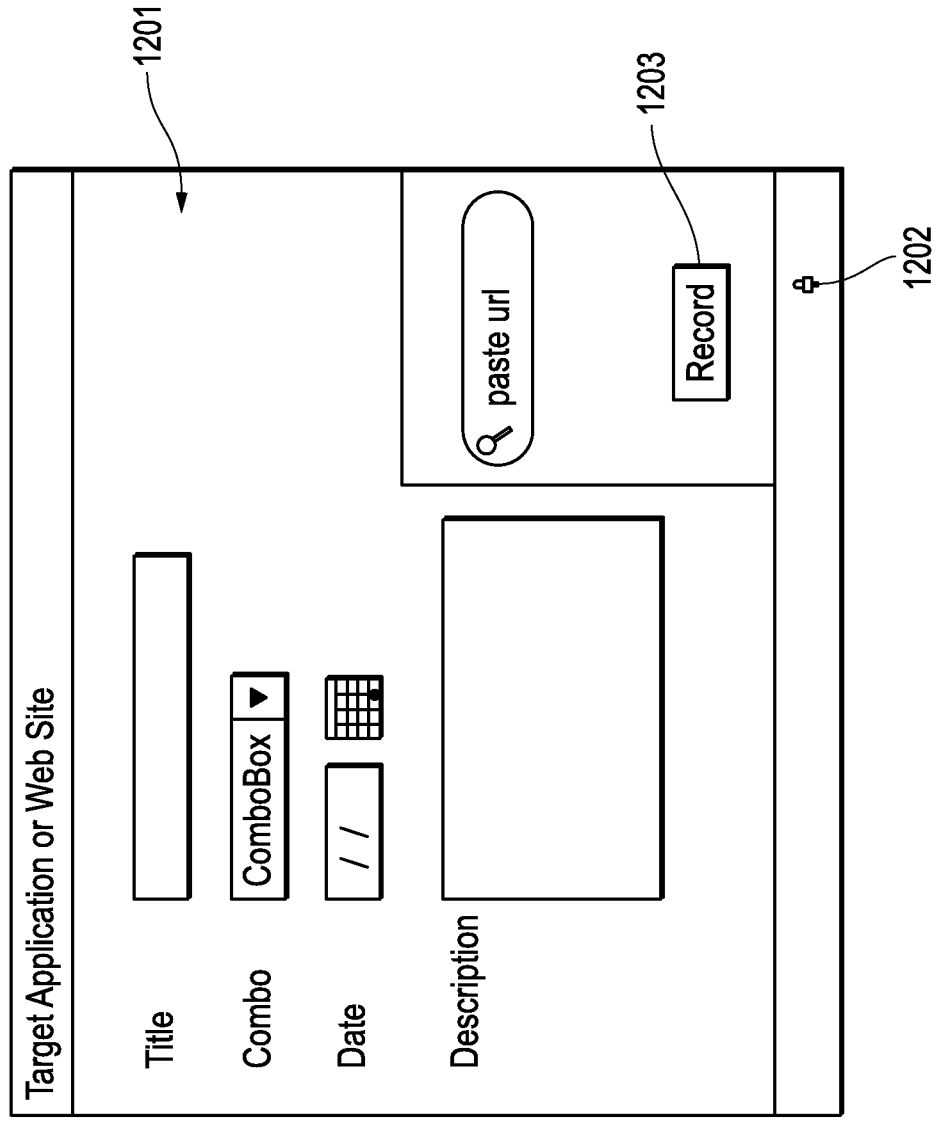
FIG. 13 is a screen shot of an application or website prepared to accept a recording from a user.

Referring now to FIG. 11, wherein the combined audio stream as well as audio recorded from each source is delivered to the typist for transcription over a network using transcription software. In certain embodiments of the present invention, while the typist is transcribing the audio files, the transcription software will display a graphical representation of what audio stream has the current speaker based on the location in the audio and previous calculation from the audio streams. The typist could update the name of the speaker rather than identifying participants in the meeting as "speaker 1," "speaker 2," etc. The typist would also have the ability to add additional speakers as necessary. Also note that, while the active speaker could be designated by a certain color, it would also be possible to shade or otherwise identify speakers who are also speaking, but who are not the active speaker at that time.

In another embodiment of the invention, offsite transcription is integrated into any text box of an application or a website by using a recording application. The recording application captures the user's voice and generates a unique URL per recording that links to a website where the user can playback the recording, view a transcription of the recording, and place the transcribed text into the text box.

Figure 14:
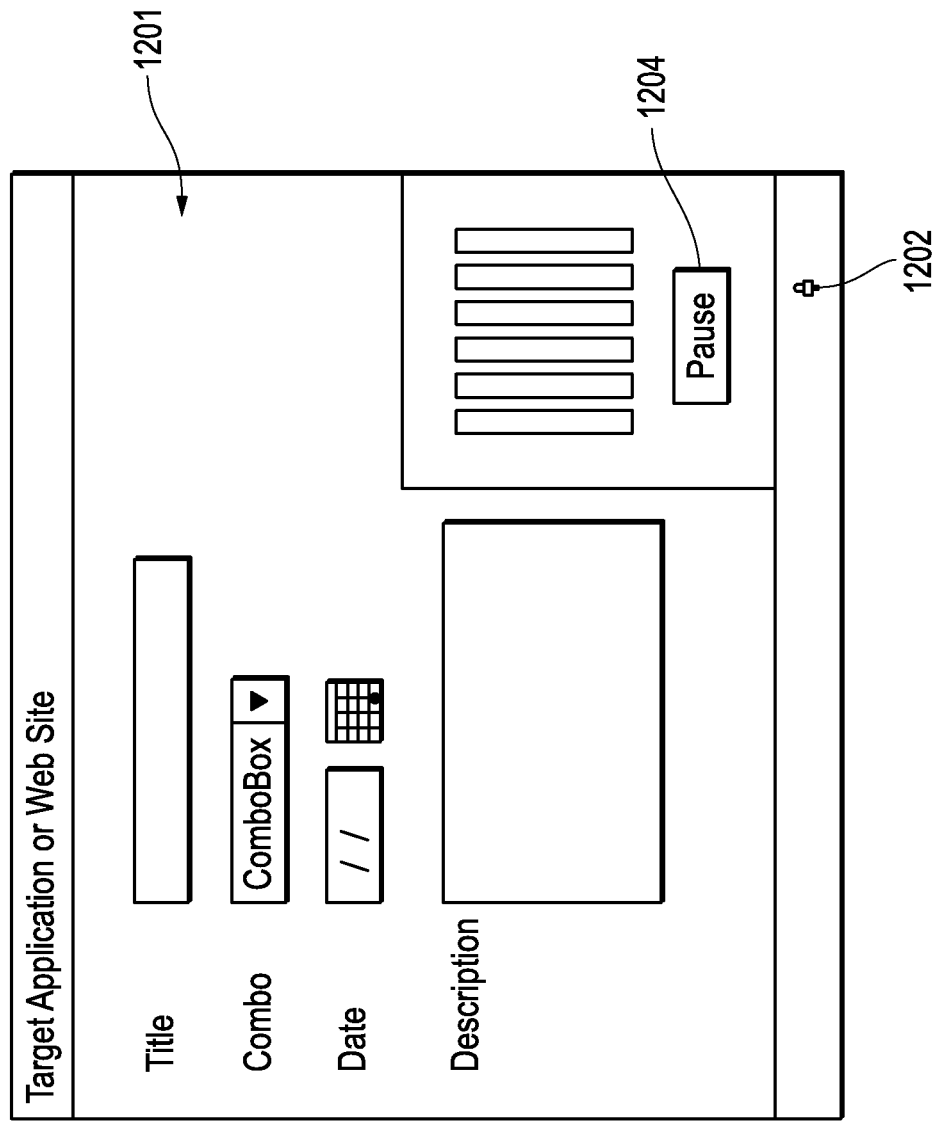
FIG. 14 is a screen shot of an application or website during the recordation process.
Figure 15:
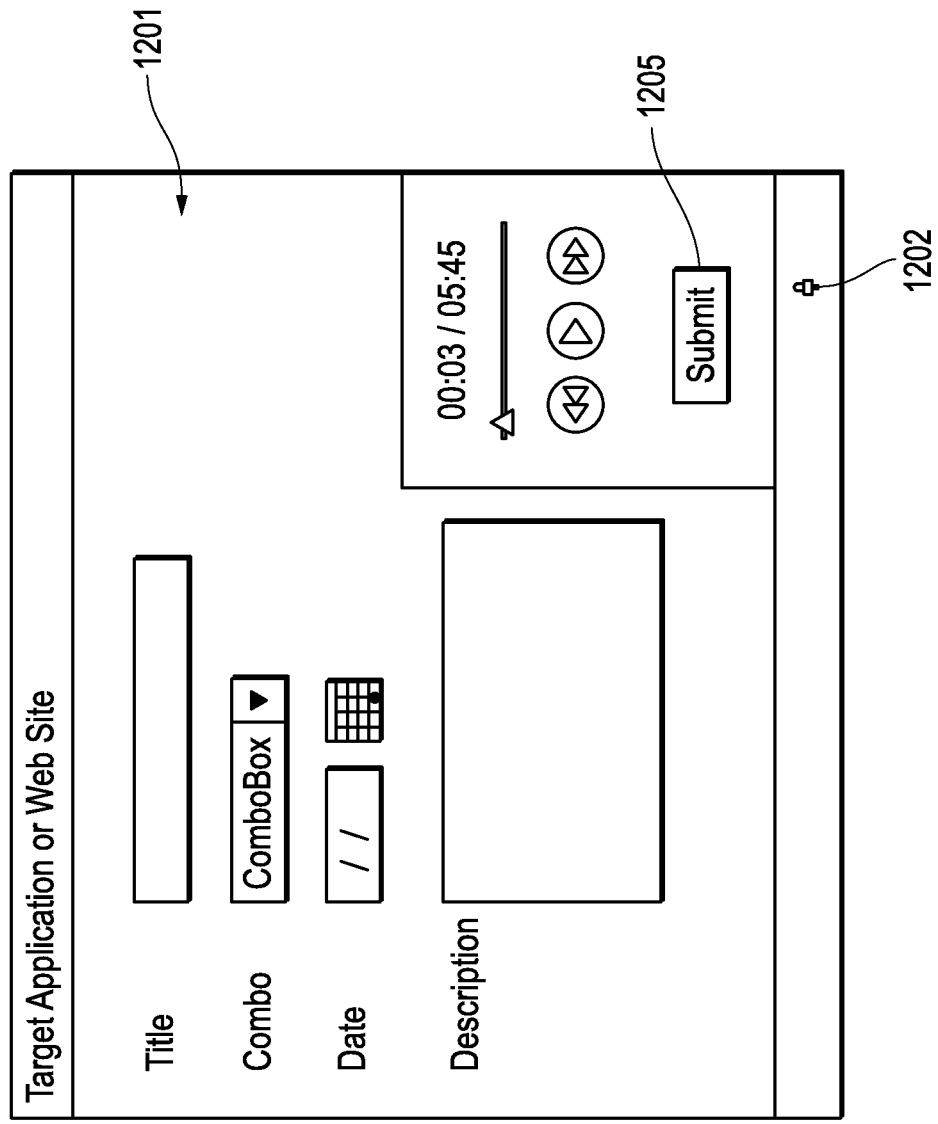
FIG. 15 is a screen shot of an application or website prepared for the submission of the dictation to the transcriptionist.

Referring now to FIG. 12, FIG. 13, FIG. 14 and FIG. 15, wherein a user opens a designated website 1201. Next, the user clicks on the recording link icon 1202 from the system tray to open the recording link application and then clicks on the "record" button 1203. Then the user dictates the audio to be transcribed, during which time the application or website 1201 may appear as shown in FIG. 14. The user may then edit or play back the audio. When the user is finished, the user will click on the submit button 1205 to submit the audio for transcription.

Figure 16:
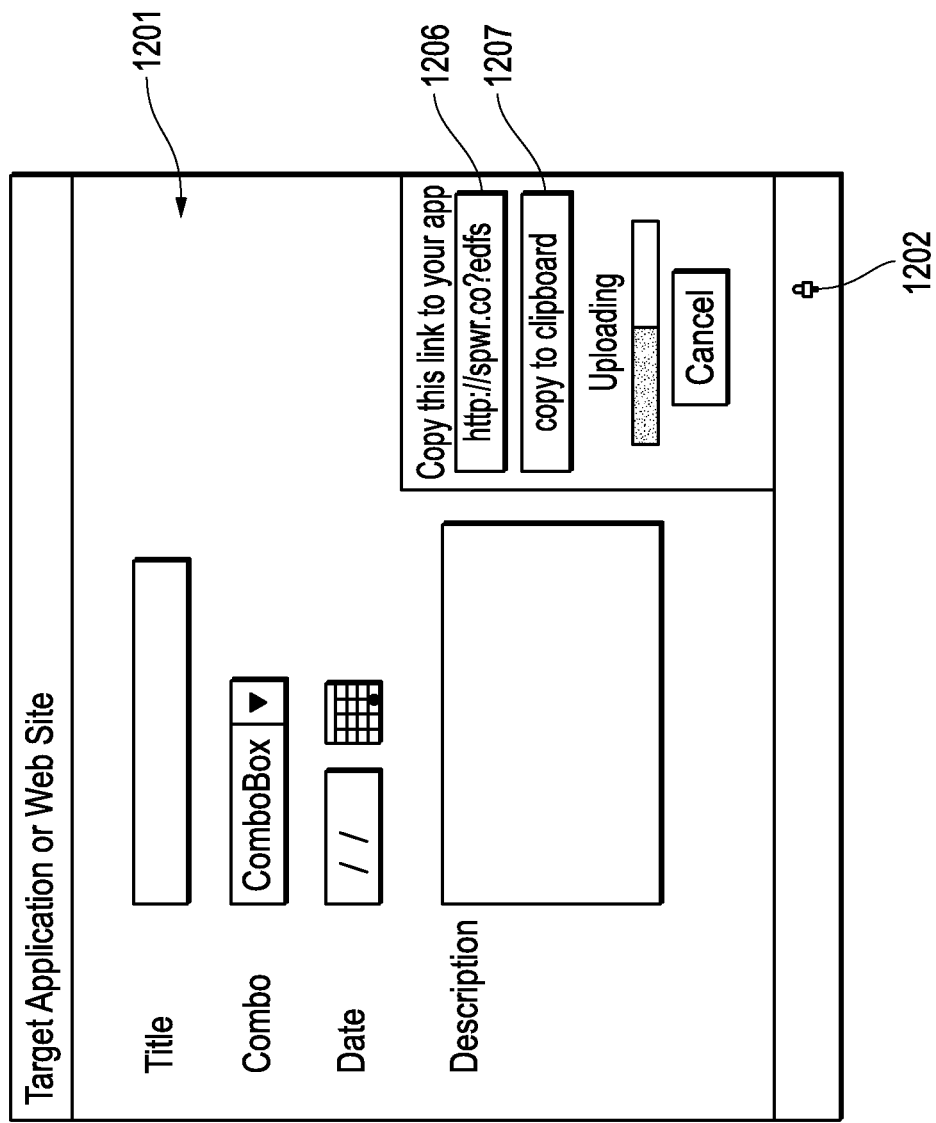
FIG. 16 is a screen shot of an application or website during the uploading process to the transcriptionist.

As shown in FIG. 16, after the user presses the "submit" button, a URL will be displayed to the user while the audio is uploading to a server. The user may select the link 1206 and then copy and paste the URL into a field in the designated website as shown in FIG. 17. Alternatively, the user may click the "Copy to Clipboard" button 1207, whereupon the URL is copied directly to the desired location.

While the audio file is in the process of being transcribed, the designated website may appear as shown in FIG. 18. Any user with the appropriate authorization can navigate to the URL generated by the recording application to view the status of the transcription, the text from the transcription if it is completed, and a link which, if activated, allows the user to listen to the audio file.

Figure 19:
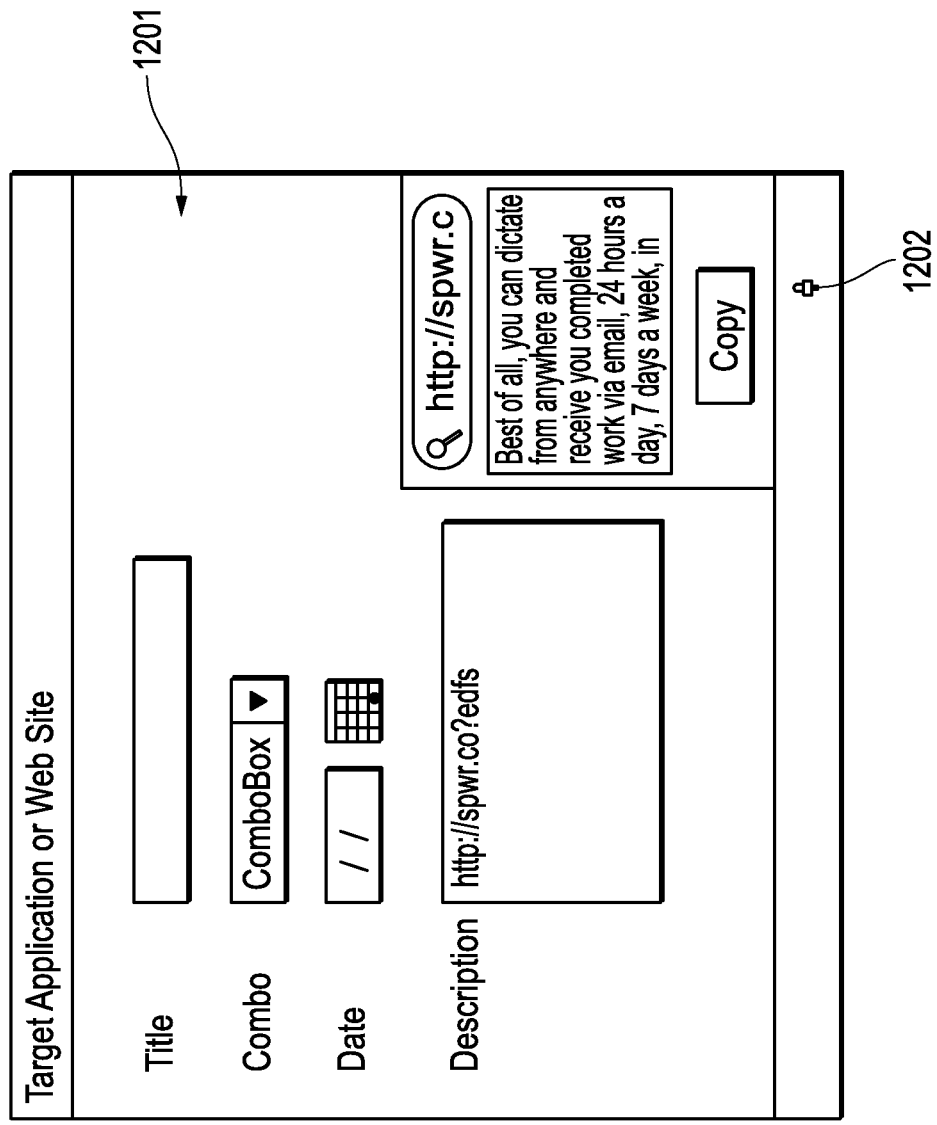
FIG. 19 is a screen shot of an application or website in which the transcribed content has been placed into the desired location.

There are at least two alternative methods for placing the transcription into the designated website. In the first method, shown in FIG. 19, after the transcription is completed, the user can navigate back to the location in the designated website, copy the URL generated by the recording application, and paste the URL back into the recording application. The recording application will then retrieve and display the transcribed text.

Figure 20:
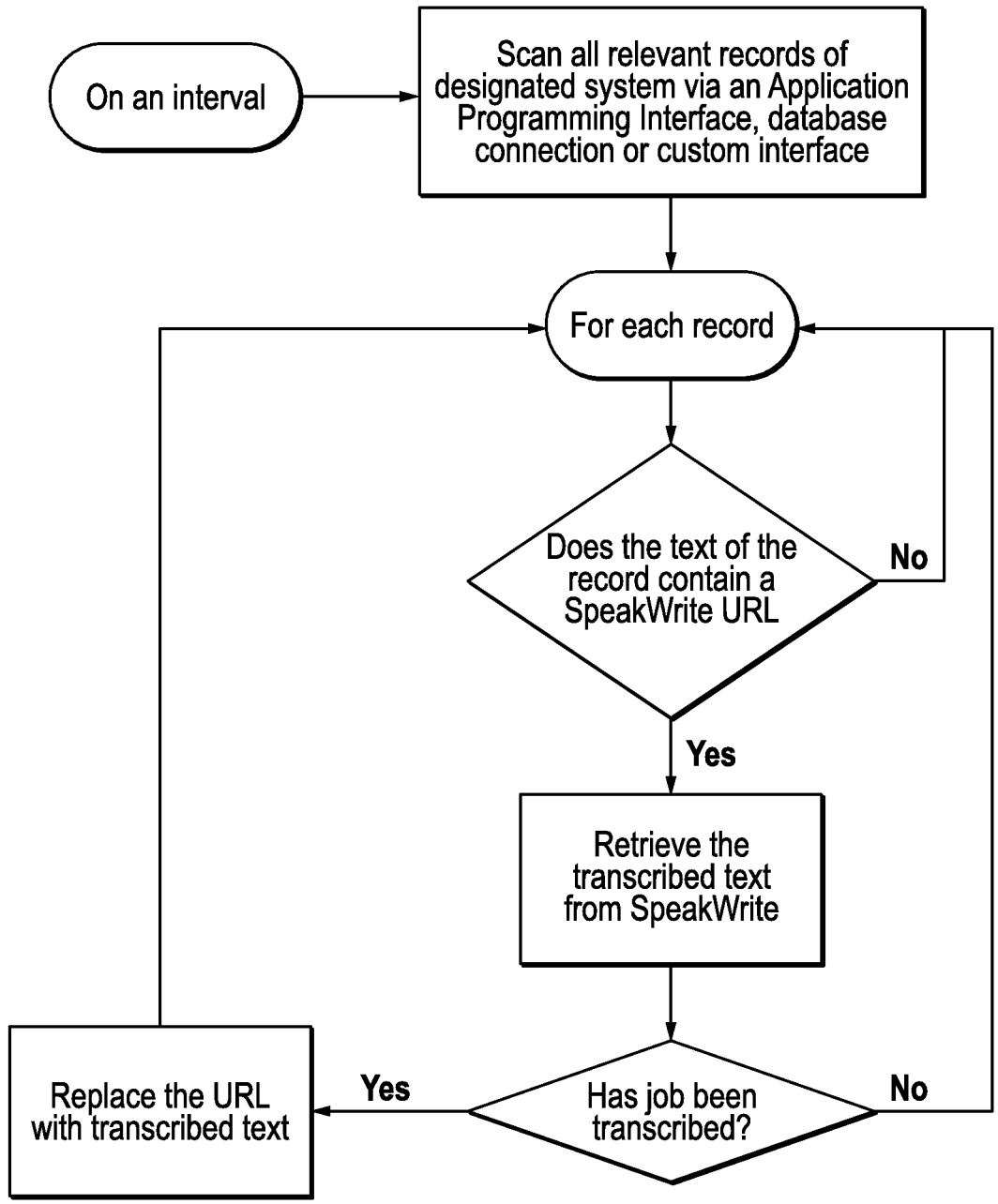
FIG. 20 is a flow diagram showing the process for dictating content into a field on an application or website.

Alternatively, an automatic integration method is shown in the flow diagram depicted on FIG. 20. The automatic integration method may require an agent that periodically monitors the designated website checking for a URL from the recording application. If it finds a URL from the recording application, it will replace the link with the transcribed text automatically.

While the present device has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of possible dictation and transcription methods and systems available, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A method for recording a meeting, comprising:
   receiving on a server two or more audio streams from speakers in a meeting;
   temporally synchronizing the audio streams;
   normalizing volume of the audio streams;
   evaluating audio samples during the progression of the audio streams and, at such time as an audio stream has the highest amplitude for a predetermined period, designating that audio stream as the active speaker; and
   at such time as a different audio stream has the highest amplitude for the predetermined period, designating that audio stream as the active speaker.

2. The method of claim 1, wherein the audio streams are recorded using mobile devices.

3. The method of claim 1, wherein the audio streams are temporally synchronized by aligning a designated amplitude within the audio streams across each of the audio streams.

4. The method of claim 1, wherein the volume of the audio streams is normalized by adjusting the maximum amplitude of each of the audio streams so that they are substantially the same.

5. The method of claim 1, further comprising consolidating those portions of the audio streams designated as active speaker to create a single master audio stream.

6. A system for recording a meeting, comprising:
   one or more recording devices configured to record participants in a meeting;
   one or more servers configured with one or more software applications configured to convert the recordings into audio streams;
   the one or more software applications further configured to temporally synchronize the audio streams, normalize volume of the audio streams, and evaluate audio samples during the progression of the audio streams such that, when an audio stream has the highest amplitude for a predetermined period, that audio stream is designated as the active speaker, and when a different audio stream has the highest amplitude for the predetermined period, that audio stream is designated as the active speaker.

7. The system of claim 6, wherein the recording device is a mobile device.

8. The system of claim 6, wherein the audio streams are temporally synchronized by aligning a designated amplitude within the audio streams across each of the audio streams.

9. The system of claim 6, wherein the volume of the audio streams is normalized by adjusting the maximum amplitude of each of the audio streams so that they are substantially the same.

10. The system of claim 6, where in the one or more software applications are further configured to consolidate those portions of the audio streams designated as active speaker to create a single master audio stream.

* * * * *